2,751,384
PHOSPHONAMIDE DERIVATIVES OF TRIAZINE

Harry W. Coover, Jr., and Richard L. McConnell, Kingsport, Tenn., assignors to Eastman Kodak Company, Rochester, N. Y., a corporation of New Jersey No Drawing. Application October 29, 1954, Serial No. 465,744

10 Claims. (Cl. 260—248)

This invention relates to new phosphorus containing compounds. More particularly, this invention relates to new organophosphorus compounds of the general type

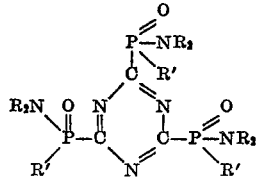

where R is an alkyl group containing 1 to 4 carbon atoms and R′ is a dialkylamido group containing 1 to 4 carbon atoms in each alkyl group, an alkoxy group containing 1 to 8 carbon atoms, or an aryloxy group. These phosphorus containing products are readily prepared by the reaction of molar proportions of cyanuric chloride with an alkyl bis-(dialkylamido)phosphite, a dialkyl dialkylamidophosphite or an alkyl aryl dialkylamidophosphite as represented by the following two equations:

(1)
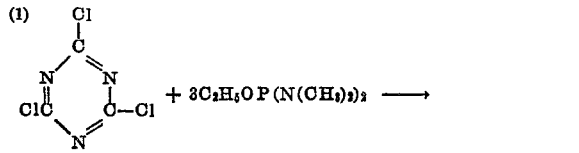

(2)
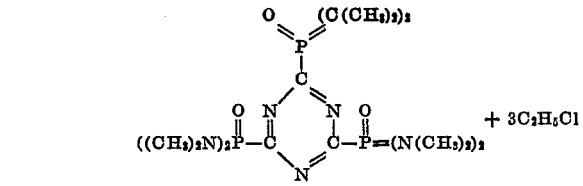

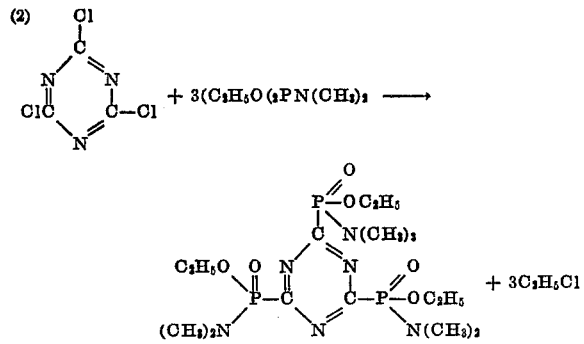

We have found that new compounds of the type set forth above can be prepared by the reaction referred to above, and accordingly, it is an object of our invention to provide these compounds and a process for their preparation.

The new organophosphorus compounds claimed herein are useful as plasticizers, solvents, insecticides, and intermediates for the preparation of other organophosphorus compounds. When used as plasticizers in cellulose esters, greatly improved flame resistance is observed.

The following examples will illustrate the invention.

*Example 1.—Tris(bis(dimethylamido)phosphono)triazine*

Cyanuric chloride (18.4 g.) and ethyl bis(dimethylamido)phosphite (49.2 g.) were mixed with stirring in a flask equipped with an efficient condenser. A vigorous reaction followed the mixing of the two components and was controlled by submerging the reaction flask in an ice bath. After the spontaneous reaction had subsided, the reaction mixture was carefully heated for one hour just below the reflux temperature. The solid product obtained by cooling the reaction mixture was filtered and washed with ether. The yield was about 45 g. of material which could be recrystallized from various hydrocarbons.

*Example 2.—Tris(bis(dibutylamido)phosphono) triazine*

Cyanuric chloride (18.4 g.) and ethyl bis(dibutylamido)phosphite (99.6 g.) were reacted according to the procedure given in Example 1. The product was a viscous oil.

*Example 3.—Tris(ethyl dimethylamidophosphono) triazine*

Cyanuric chloride (18.4 g.) and diethyl dimethylamidophosphite (49.5 g.) were reacted according to the procedure given in Example 1.

*Example 4.—Tris(octyl dimethylamidophosphono) triazine*

Cyanuric chloride (18.4 g.) and dioctyl dimethylamidophosphite (99.9 g.) were reacted according to the procedure given in Example 1. The liberated octyl chloride had to be removed under reduced pressure leaving a viscous oily product.

*Example 5.—Tris(phenyl dimethylamidophosphono)triazine*

Cyanuric chloride (18.4 g.) and ethyl phenyl dimethylamidophosphite (63.9 g.) were reacted according to the procedure in Example 1. The product was a viscous oil.

*Example 6.—Preparation of cellulose acetate film*

Two grams of cellulose acetate powder and 18 ml. of acetone were placed in a screw cap vial and agitated until a smooth, transparent dope was obtained. Then 0.5 g. of tris(ethyl dimethylamidophosphono) triazine was added and agitated until it had dissolved. This dope was poured on a glass plate and a thin film prepared with a doctor blade. When the acetone had evaporated, the transparent, well plasticized film was removed from the plate and heated in an oven at 85° C. for 30 minutes to remove any residual acetone. The flame resistance of this film was measured by clamping a strip of film (0.5″ x 6″) horizontally in a draft free burning shield. A piece of wire gauze was clamped just below the strip of film. After igniting the end of the film with a burning splint, the number of relights or the time required to consume the film are noted. Six to eight relights were required to completely consume samples of the above-described film while cellulose acetate film plasticized with a conventional plasticizer such as diethyl phthalate was completely consumed with only one ignition in 25 seconds. The other phosphorus containing triazines had similar flameproofing action.

We claim:

1. A new composition of matter having the structure

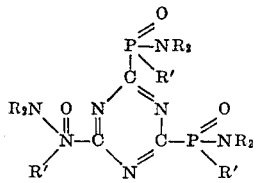

where R is an alkyl group containing 1 to 4 carbon atoms and R' is selected from dialkylamido groups containing 1 to 4 carbon atoms in each alkyl group, alkoxy groups containing 1 to 8 carbon atoms, and aryloxy groups.

2. A composition according to claim 1 wherein R' is a dialkylamido group containing 1–4 carbon atoms in each alkyl group.

3. A composition according to claim 2 wherein R' is a dimethylamido group.

4. A composition according to claim 2 wherein R' is a dibutylamido group.

5. A composition according to claim 1 wherein R' is an alkoxy group containing 1–8 carbon atoms.

6. A composition according to claim 5 wherein R' is an ethoxy group.

7. A composition according to claim 5 wherein R' is an octyloxy group.

8. A composition according to claim 1 wherein R' is an aryloxy group.

9. A composition according to claim 8 wherein R' is a phenoxy group.

10. A process for preparing the compositions of claim 1 comprising mixing together cyanuric chloride with a compound having the following formula:

$$(RO)_xP(NR'_2)_y$$

wherein R is selected from aryl and 1–8 carbon alkyl groups, R' is selected from 1–4 carbon alkyl groups, and $x$ and $y$ each are at least 1 and total 3.

References Cited in the file of this patent

UNITED STATES PATENTS

| | | |
|---|---|---|
| 2,299,200 | Adams | Oct. 20, 1942 |
| 2,418,224 | Georges | Apr. 1, 1947 |
| 2,510,564 | Dudley | June 6, 1950 |
| 2,685,581 | Coover | Aug. 3, 1954 |